US008065785B2

(12) United States Patent
Brown et al.

(10) Patent No.: US 8,065,785 B2
(45) Date of Patent: Nov. 29, 2011

(54) METHOD FOR PRODUCING A TURBULENCE CONDITIONER FOR USE WITH AN ULTRASONIC FLOW METER IN A PIPE

(75) Inventors: Gregor Brown, Ayrshire (GB); Herbert Estrada, Annapolis, MD (US); Donald R Augenstein, Pittsburgh, PA (US); Keith Bergstrom, Herminie, PA (US)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 12/807,193

(22) Filed: Aug. 31, 2010

(65) Prior Publication Data

US 2011/0005335 A1  Jan. 13, 2011

Related U.S. Application Data

(62) Division of application No. 12/002,270, filed on Dec. 14, 2007, now Pat. No. 7,823,462.

(51) Int. Cl.
*B23P 17/04* (2006.01)

(52) U.S. Cl. ......................................................... 29/592

(58) Field of Classification Search .. 73/861.26–861.28; 29/592
See application file for complete search history.

(56) References Cited

U.S. PATENT DOCUMENTS

| 4,958,524 | A | 9/1990 | Bonner et al. |
| 5,341,848 | A | 8/1994 | Laws |
| 6,119,528 | A | 9/2000 | Genack |
| 6,128,072 | A | 10/2000 | Kiel et al. |
| 6,647,806 | B1 | 11/2003 | Estrada et al. |
| 6,748,811 | B1 | 6/2004 | Iwanaga et al. |
| 6,796,173 | B1 | 9/2004 | Lajoie |
| 6,823,743 | B2 | 11/2004 | Sato et al. |
| 6,851,322 | B2 | 2/2005 | Gallagher |
| 2007/0151362 | A1 | 7/2007 | Mori |

FOREIGN PATENT DOCUMENTS

EP  1188935  *  3/2002

* cited by examiner

*Primary Examiner* — Jewel V Thompson
(74) *Attorney, Agent, or Firm* — Ansel M. Schwartz (57) ABSTRACT

A method for producing a turbulence conditioner for use with an ultrasonic flow meter in a pipe having the steps of identifying an effective diameter of an aperture of the flow meter to be disposed in an opening in the pipe through which the flow meter communicates pulses of ultrasonic energy with the interior of the pipe. There is the step of building a conditioner with a pitch between openings in the conditioner which is less than the effective diameter.

8 Claims, 13 Drawing Sheets

METHOD FOR PRODUCING A TURBULENCE CONDITIONER FOR USE WITH AN ULTRASONIC FLOW METER IN A PIPE

CROSS-REFERENCE TO RELATED APPLICATIONS

This is a divisional application of U.S. patent application Ser. No. 12/002,270 filed Dec. 14, 2007 now U.S. Pat. No. 7,823,462.

FIELD OF THE INVENTION

The present invention is related to the altering of the structure of turbulence in a pipe such that the turbulent variations of the fluid velocity, as measured by a transit time ultrasonic flow meter downstream of a turbulence conditioner, are much reduced. (As used herein, references to the "present invention" or "invention" relate to exemplary embodiments and not necessarily to every embodiment encompassed by the appended claims.) The reduction in turbulent velocity variations facilitates the "proving" of the ultrasonic meter—confirming its calibration against a standard—making it possible to confirm this calibration with significantly fewer runs of the prover than is possible with the same ultrasonic meter and the same prover operating without the turbulence conditioner.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Transit time ultrasonic flowmeters have exhibited excellent repeatability and absolute accuracy in many flow measurement applications. However, characteristics inherent in the nature of their measurements present difficulties when these meters are applied to custody transfer measurements of petroleum products. A custody transfer takes place when ownership of a batch of a particular product changes. On a small scale, such a transfer takes place at the pump in a gas station, between the owner of the gas station and his customer.

It is industry practice in custody transfer measurements to "prove" the meter; that is, to establish its calibration accurately, by independent means. Provers are usually devices of fixed and precisely established volume. The time required to deliver the volume of product defined by the prover is accurately defined by the transit of a ball or piston, pushed by the product, from one end of the prover to the other. High speed diverter valves initiate the prover run and bypass the prover when the ball reaches the end of its travel. Position switches at the beginning and end of the prover synchronize the proving operation with the operation of the custody transfer meter—the meter to be used to measure the amount of product delivered to a specific customer. The volumetric output measured by the custody transfer meter (in traditional practice, a turbine or positive displacement meter) during the proving run is compared to the volume of the prover and a meter factor (i.e., a calibration correction) is established.

It is also industry practice to perform a set of several prover runs—five is typical—to establish the "repeatability" of the meter factor of the custody transfer meter. Repeatability in the petroleum industry is usually defined as follows: the difference between the high and low meter factors from a set of prover runs, divided by the low meter factor from that set. The repeatability (or in statistical terminology, "range") of a set of proving runs is a measure of the uncertainty of the meter factor as determined by the average of the results of that set of runs. For example, a repeatability of 0.05% in 5 runs of the prover indicates that the true meter factor for the custody transfer meter lies within a ±0.027% band of the mean meter factor from that run set, with 95% confidence. A meter factor of this accuracy is the accepted standard for custody transfer measurement.

Unlike turbine and positive displacement flow meters, a transit time ultrasonic flow meter does not measure volumetric flow rate continuously, but instead infers it from multiple samples of fluid velocity. Specifically, the volumetric flow rate is determined from periodic measurements of the axial fluid velocity as projected onto one or more acoustic paths—paths along which the transit times of pulses of ultrasound are measured. The path velocity measurements are combined according to rules appropriate to their number and location in the pipe. Many meters employ parallel chordal paths arranged in accordance with a specific method of numerical integration.

The period over which an ultrasonic transit time meter collects a single set of velocity measurements (one velocity measurement or more, depending on the number of paths) is determined by the path transit times, the number of paths, and the data processing capabilities of the meter itself. For liquid meters, the flow samples will typically be collected over periods ranging from 5 to 100 milliseconds, resulting in sample frequencies between 10 Hz and 200 Hz. These figures may differ from one ultrasonic meter design to another.

An ultrasonic flow measurement is thus a sample data system on two counts:

(1) It does not measure the velocity everywhere across the pipe cross section but only along the acoustic paths, and
(2) It does not measure velocity continuously, but instead takes a series of "snapshots" of the velocity from which it determines an average.

Because of these properties, a transit time ultrasonic meter responds to flow phenomena like turbulence differently than other meters commonly used for custody transfer in the petroleum industry. More specifically, the individual flow measurements of transit time ultrasonic meters will be affected by the small scale random (i.e., turbulent) variations in local fluid velocity. These variations are both temporal and spatial, and an ultrasonic instrument must make multiple measurements to determine the true average flow rate—to reduce the random error contributions due to turbulence to acceptable levels. Turbine meters and positive displacement meters, on the other hand, respond to the flow field in the pipe as a whole; integration of the fluid velocity in space and time is inherent in the nature of their responses. On the other side of the ledger, transit time ultrasonic meters are not encumbered by physical limitations like bypass leakage and friction, and may therefore provide measurement capability over a wider range of velocity and viscosity conditions.

For custody transfer, flow meters are designed to produce pulses per unit volume of fluid that passes through them (for example, 1000 pulses/barrel). The meter factor MF is given by:

$$MF=V/NP$$

Here

V is the volume of the standard—the prover—between the two position switches embedded in its walls. When a proving run is initiated the flowing fluid is diverted through the prover and pushes a ball or piston past the upstream switch, initiating the run, which is terminated when the ball or piston reaches the downstream switch NP is the number of pulses produced by the meter during the period which begins when the upstream switch is actuated (time T1) and ends when the downstream switch is actuated (time T2).

Ultrasonic meters determine a flow rate Q in volume units per second from individual measurements of fluid velocity along one or more acoustic paths. They therefore must generate pulses by means of a frequency converter that produces pulses at a rate k exactly proportional to the volumetric flow rate. Thus the number of pulses NP is given by:

$$NP=kQ(T2-T1)$$

If the uncertainties in the volume of the standard, the frequency converter k, and the actuations of the upstream and downstream switches are ignored (these terms are generally smaller by an order of magnitude than the uncertainties associated with the flow instrument calibration. In more detailed analyses they are not ignored), the per unit uncertainty in meter factor for a 95% confidence level is given by:

$$dMF/MF=2dQ(N)/Q=2\sigma_{mean}(N)$$

Where $dQ(N)$ is one standard deviation of the mean of the N flow samples collected during the prove, or $\sigma_{mean}(N)$.

One standard deviation of the mean, $\sigma_{mean}(N)$, of N representative flow samples taken during a proving run is given by:

$$\sigma_{mean}(N)=S/(N)^{1/2}$$

Here, S is the standard deviation of the population of flow samples—the quantitative characterization of the random variability, produced by the turbulence, in the individual flow measurements of the ultrasonic meter, from one flow sample to the next.

An examination of the above equation reveals the variables that must be controlled to achieve satisfactory proving performance in ultrasonic meters: the turbulence intensity as it affects the standard deviation of the flow samples, S, in combination with the number of samples, N, accumulated during each proving run. These parameters must be such that $\sigma_{mean}(N)$ is small enough to ensure that the range of measured meter factors does not exceed the requirement. Calculations indicate that, if $\sigma_{mean}(N)$ can be made small, meters will prove successfully more than 99% of the time.

Meeting these requirements is not straightforward. With a typical line prover operating at nominal flow rate, the duration of a single proving run is about 20 seconds, more or less. If a sample frequency of 50 Hz is assumed, the number of samples that will be collected during a proving run is 20×50=1000. As noted in the previously referenced patent, the random variations due to turbulence in the flow measurements of a four path chordal ultrasonic can be in the 1.75% range (one standard deviation or S) though upstream piping can lead to variations as low as 1.2% or as high as 3%. Substituting the 1.2% figure, 20 second proving runs will produce a $\sigma_{mean}(N)$ of about 0.04%. With the this value of $\sigma_{mean}(N)$, the probability of obtaining a set of 5 proving runs within a 0.05% range is less than 40%, a figure essentially consistent with actual proving experience. Experience also confirms what calculations show: Higher turbulence will produce still smaller probabilities of success.

This, then, is the problem. Turbulence, such as normally encountered in petroleum product pipelines, adversely affects the repeatability of the meter factors for transit time ultrasonic flowmeters, as measured in short duration prover runs. Unless something is done to alter the character of the turbulence, it appears that ultrasonic flowmeter meter factors measured with conventional provers will not achieve repeatability figures meeting petroleum industry expectations.

U.S. Pat. No. 6,647,806 is based on the hypothesis put forward by Dryden. (Hugh L. Dryden and G. B. Schubauer, *The Use of Damping Screens for the Reduction of Wind Tunnel Turbulence*, Journal of Aeronautical Science, April 1947.) He tied the reduction in turbulence produced by a series of one or more fine mesh screens in cascade to the production of eddies of very small diameters whose energy was dissipated as heat in a settling chamber downstream of the screen(s). Because screens are structurally impractical for resisting the hydraulic forces produced by liquid flow, the means proposed by the patent endeavored to produce the same effect with relatively small holes in plates. It will be seen in the data of Table 1 of that patent, reproduced below, that the improvements achieved were small. The largest reductions in turbulent variations cited in the prior patent were produced by reducers, either alone, or in combination with plates having small holes.

TABLE 1

Reproduced from U.S. Pat. No. 6,647,806 B1

| Turbulence conditioner Configuration | Standard Deviation of One Flow Sample |
| --- | --- |
| Straight pipe with no diffuser mechanism | 1.2% to 1.75%* |
| Large hole perforated plate | 1.61% |
| Small hole perforated plate | 0.93% |
| Reducer immediately upstream | 0.63% |
| Reducer/large hole perforated plate | 0.64% |
| Reducer/small hole perforated plate | 0.59% |

*The lower figure was not included in the referenced patent, but reflects multiple measurements made subsequent to the filing of that patent. Standard deviations higher than 1.75% can be found 5 to 10 diameters downstream of hydraulic disturbances such as bends, compound bends, and header exits.

The method for reducing the effects of turbulence employed by the turbulence conditioners of this invention does not rely on the elimination of turbulence through the dissipation of very small eddies. Rather, the reduction in the random deviations of flow samples is brought about reducing the eddy sizes such that they are effectively averaged within the acoustic beams of the ultrasonic meter.

The reduction in eddy sizes produced by the turbulence conditioners of this invention also leads to an increase in the frequencies of the random variations in fluid velocity produced by the turbulence. The frequency increases also lead to improved proving performance, by making a limited sample of N velocity measurements collected during a proving run more representative of the entire population of velocity variations.

SUMMARY OF THE INVENTION

The present invention pertains to an apparatus for determining fluid flow in a pipe. The apparatus comprises an ultrasonic flowmeter which communicates with the interior of the pipe through at least one pair of apertures, where each aperture of the one pair of apertures has an effective diameter. The apparatus comprises a turbulence conditioner disposed in the pipe having openings where the pitch between openings is a function of the effective diameter of the apertures.

The present invention pertains to a turbulence conditioner for a pipe. The conditioner has openings and a pitch. The conditioner has walls between the openings whose thickness is a function of the pitch. The conditioner has a length which is a function of the pitch.

The present invention pertains to a method for determining fluid flow in a pipe. The method comprises the steps of flowing fluid through a turbulence conditioner disposed in the pipe having openings where the pitch between openings is made a function of an effective diameter of an aperture of an ultrasonic flowmeter which communicates with the interior of the pipe through the aperture. There is the step of measuring the flow with the meter.

The present invention pertains to a method for producing a turbulence conditioner for use with an ultrasonic flow meter in a pipe. The method comprises the steps of identifying an effective diameter of an aperture in the pipe through which the flowmeter communicates with the interior of the pipe. There is the step of determining a pitch between holes in the conditioner as a function of the effective diameter.

The present invention pertains to an apparatus for determining fluid flow in a pipe, comprising an ultrasonic transit time flowmeter and a turbulence-altering turbulence conditioner, both placed in the pipe. The alteration of the turbulence by the apparatus is such that a meter calibration meeting very narrow accuracy requirements can be determined in a few runs of a prover (a volumetric standard), a capability not otherwise achievable. Several turbulence conditioner configurations that will produce the necessary alteration to the turbulence are described. A second arrangement of the apparatus is also described. It draws on a configuration employing a reducing nozzle downstream of the turbulence conditioner but upstream of the meter.

DETAILED DESCRIPTION

Referring now to the drawings wherein like reference numerals refer to similar or identical parts throughout the several views, and more specifically to FIGS. 1A, 1B, 2, 3A, 3B, 3C, 4A, 4B and 4C thereof, there is shown an exemplary apparatus 10 for determining fluid flow in a pipe 12. The apparatus 10 comprises an ultrasonic flowmeter 14 which communicates with the interior of the pipe 12 through at least one pair of apertures 18, where each aperture 18 of the one pair of apertures 18 has an effective diameter. The apparatus 10 comprises a turbulence conditioner 16 disposed in the pipe 12 having openings 22 where the pitch between openings 22 is a function of the effective diameter of the aperture 18.

The conditioner 16 has walls 20 between the openings 22 whose thickness can be a function of the pitch. The conditioner 16 has a length which can be a function of the pitch. The meter 14 can be disposed up to 3 internal pipe 12 diameters downstream of the conditioner 16. The pitch can be less than the effective diameter of the aperture 18. The walls 20 can have a thickness between ¼ and ⅒ of the pitch. The length can be 5 to 20 times the pitch. The pitch can be a function of the meter's 14 diameter. The pitch can be a function of the meter's 14 maximum velocity. The pitch can be a function of the meter's 14 sampling rate.

Figure 4A:
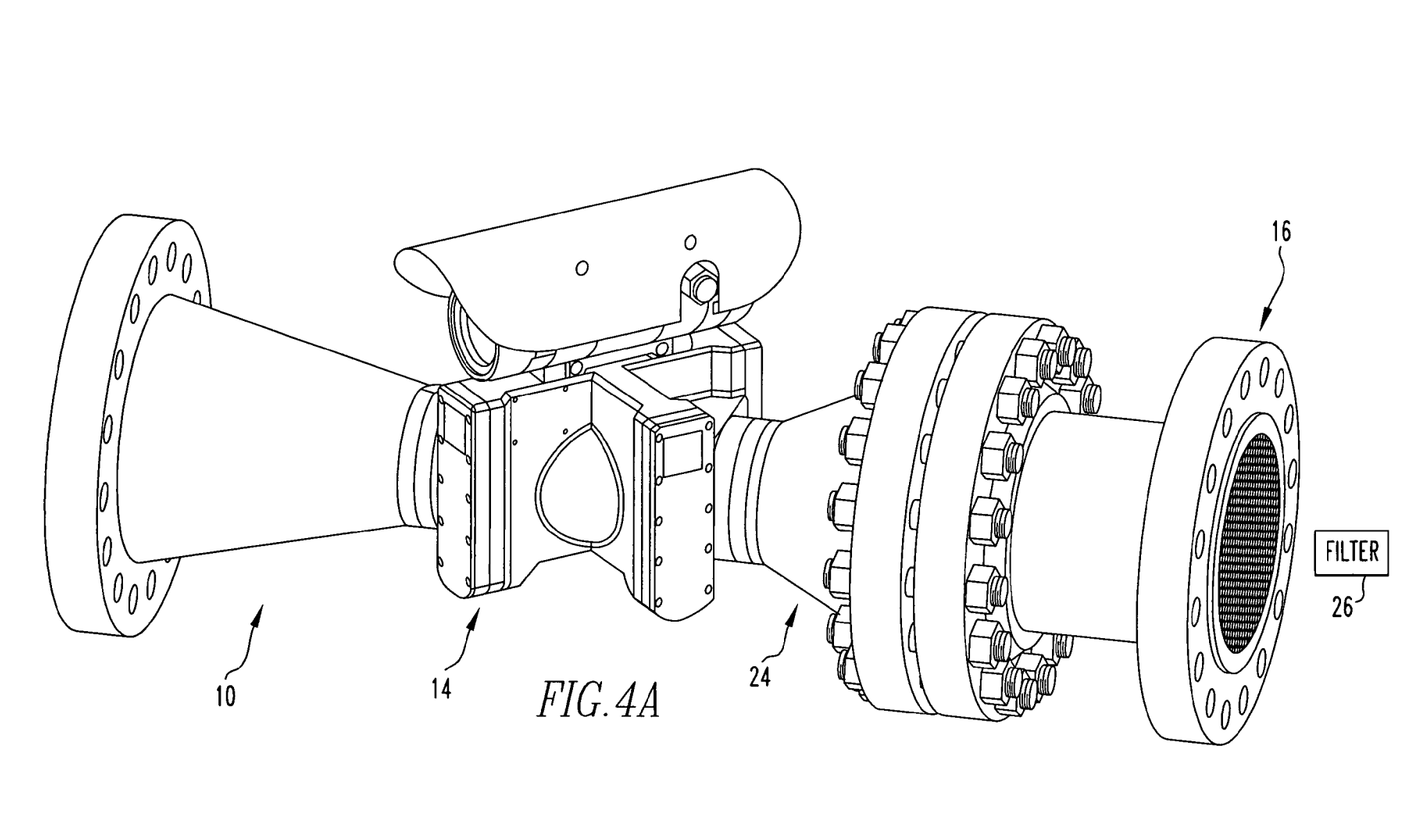
FIG. 4A is a perspective drawing of a "mini-tube" turbulence conditioner also as prescribed herein, with a reducing nozzle and chordal meter downstream (and an expanding nozzle downstream of the meter, to maintain upstream and downstream pipe diameter).
Figure 4B:
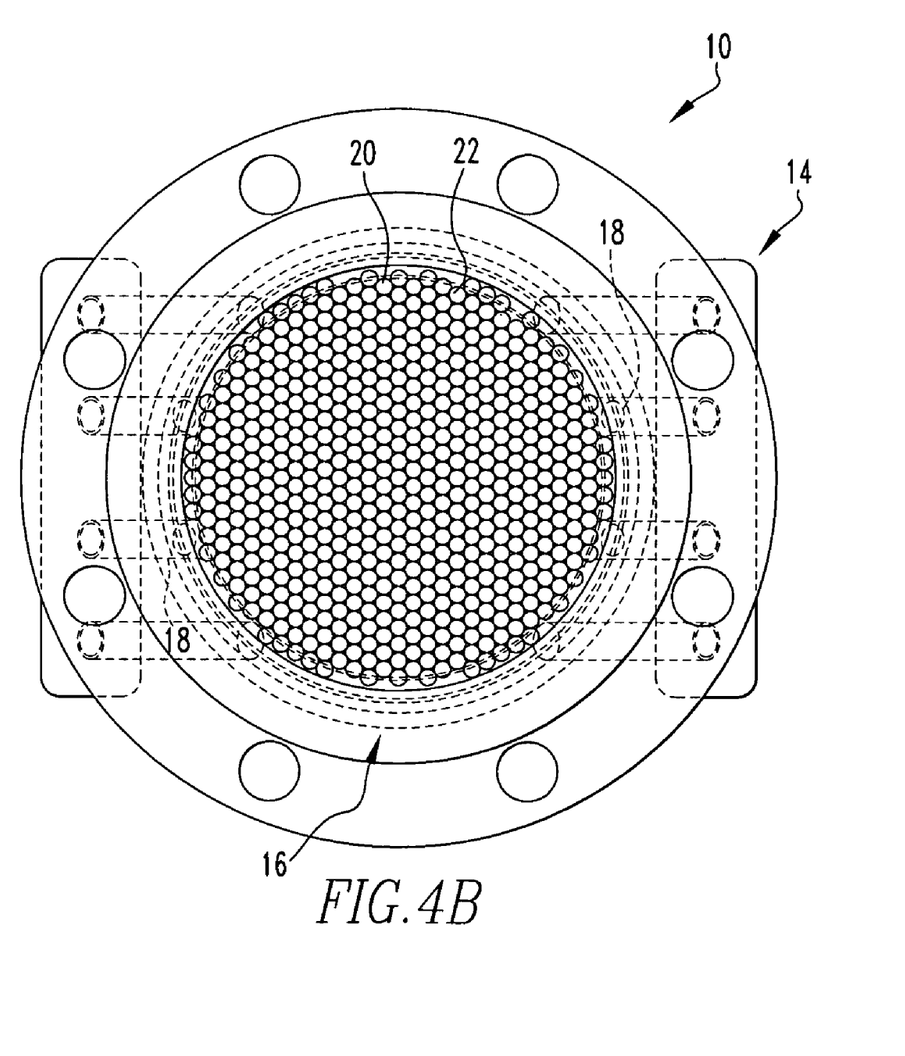
FIG. 4B is a sectional view of the "mini-tube" turbulence conditioner.
Figure 12:
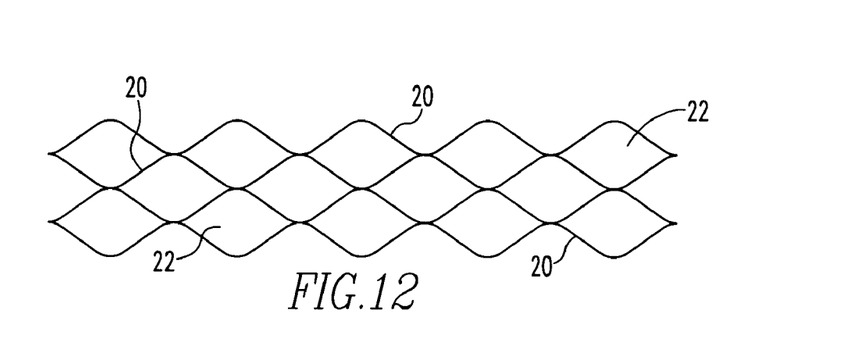
FIG. 12 is a cross-section of a conditioner with holes having 2 sides.

The holes can have a cross-section that is two or more sided. FIG. 12 shows holes that are two sided. Alternatively, the holes can have a circular cross-section, as shown in FIGS. 4a and 4b. A filter 26 can be disposed in the pipe 12 upstream from the conditioner 16. A nozzle 24 can be disposed in the pipe 12 upstream of the flowmeter 14 and downstream of the conditioner 16. The meter 14 and the conditioner 16 can satisfy proving requirements for maximum and minimum flow velocities for which the meter is designed. The conditioner 16 and the meter 14 can satisfy a proving requirement of +/−0.027% uncertainty in five proving runs.

The present invention pertains to a turbulence conditioner 16 for a pipe 12, as shown in FIGS. 1A, 1B, 2, 3A, 3B, 3C, 4A, 4B and 4C. The conditioner 16 has openings 22 and a pitch. The conditioner 16 has walls 20 between the openings 22 whose thickness is a function of the pitch. The conditioner 16 has a length which is a function of the pitch.

The present invention pertains to a method for determining fluid flow in a pipe 12. The method comprises the steps of flowing fluid through a turbulence conditioner 16 disposed in the pipe 12 having openings 22 where the pitch between openings 22, is made a function of an effective diameter of an aperture 18 of an ultrasonic flowmeter 14 which communicates with the interior of the pipe 12 through the aperture 18. There is the step of measuring the flow with the meter 14.

The flowing fluid through a turbulence conditioner 16 step can include the step of flowing the fluid through the turbulence conditioner 16 wherein the conditioner 16 has walls 20 between the openings 22 whose thickness is made a function of the pitch. The flowing fluid through a turbulence conditioner 16 step can include the step of flowing the fluid through the turbulence conditioner 16 wherein the conditioner 16 has a length which is made a function of the pitch. The flowing fluid through a turbulence conditioner 16 step can include the step of flowing the fluid through the turbulence conditioner 16 disposed up to 3 internal pipe 12 diameters upstream of the conditioner 16.

The flowing fluid through a turbulence conditioner 16 step can include the step of flowing the fluid through the turbulence conditioner 16 wherein the pitch is less than the effective diameter of the aperture 18. The flowing fluid through a turbulence conditioner 16 step can include the step of flowing the fluid through the turbulence conditioner 16 wherein the walls 20 have a thickness between ¼ to ⅒ of the pitch. The flowing fluid through a turbulence conditioner 16 step can include the step of flowing the fluid through the turbulence conditioner 16 wherein the length of the conditioner 16 is 5 to 20 times the pitch.

The flowing fluid through a turbulence conditioner 16 step can include the step of flowing the fluid through the turbulence conditioner 16 wherein the holes have a cross-section that is two or more sided. Alternatively, the flowing fluid through a turbulence conditioner 16 step includes the step of flowing the fluid through the turbulence conditioner 16 wherein the holes have a circular cross-section.

The flowing fluid through a turbulence conditioner 16 step can include the step of flowing the fluid through a filter 26 disposed in the pipe 12 upstream from the conditioner 16. The flowing fluid through a turbulence conditioner 16 step can include the step of flowing the fluid through a nozzle 24 disposed in the pipe 12 upstream of the flowmeter 14 and downstream of the conditioner 16. The measuring step can include the step of measuring the flow with the meter 14 which meets a proving requirement. The measuring step can include the step of measuring the flow with the meter 14 which meets the proving requirement of +/−0.027% uncertainty in five proving runs.

The present invention pertains to a method for producing a turbulence conditioner 16 for use with an ultrasonic flowmeter 14 in a pipe 12. The method comprises the steps of identifying an effective diameter of an aperture in the pipe 12 through which the flowmeter 14 communicates with the interior of the pipe 12. There is the step of determining a pitch between holes in the conditioner 16 as a function of the effective diameter.

There can be the step of determining a thickness of walls between the openings as a function of the pitch. There can be the step of determining a length of the conditioner 16 as a function of the pitch. There can be the step of building the conditioner 16 having the pitch, wall thickness and length determined in the determining steps. The building step could include fabricating the center portion 35 having the holes 22, cutting it to length and diameter to meet the design parameters determined for the pitch, wall thickness and length, and attaching a flange 37 to the center portion 35 so it can be seated in the pipe 12.

The present invention pertains to an apparatus 10 for determining fluid flow in a pipe 12, comprising a turbulence-altering turbulence conditioner 16 and an ultrasonic transit time flowmeter 14, both placed in the pipe 12. The arrangement facilitates the "proving" of the ultrasonic meter 14 in a number of prover runs comparable to, or better than the number required by meters of competing technologies (turbine meters and positive displacement meters)—an accomplishment not possible with conventional arrangements of ultrasonic meters 14. Several alternative configurations for the turbulence conditioner 16 are described. The turbulence conditioners 16 can also be applied to an alternative arrangement of the enclosing piping and ultrasonic meter 14 which has been described in the prior art, and in which a nozzle 24 type reducer is employed upstream of the ultrasonic meter 14 but downstream of the turbulence conditioner 16, with proving results better than previously achieved with this arrangement.

Figure 1A:
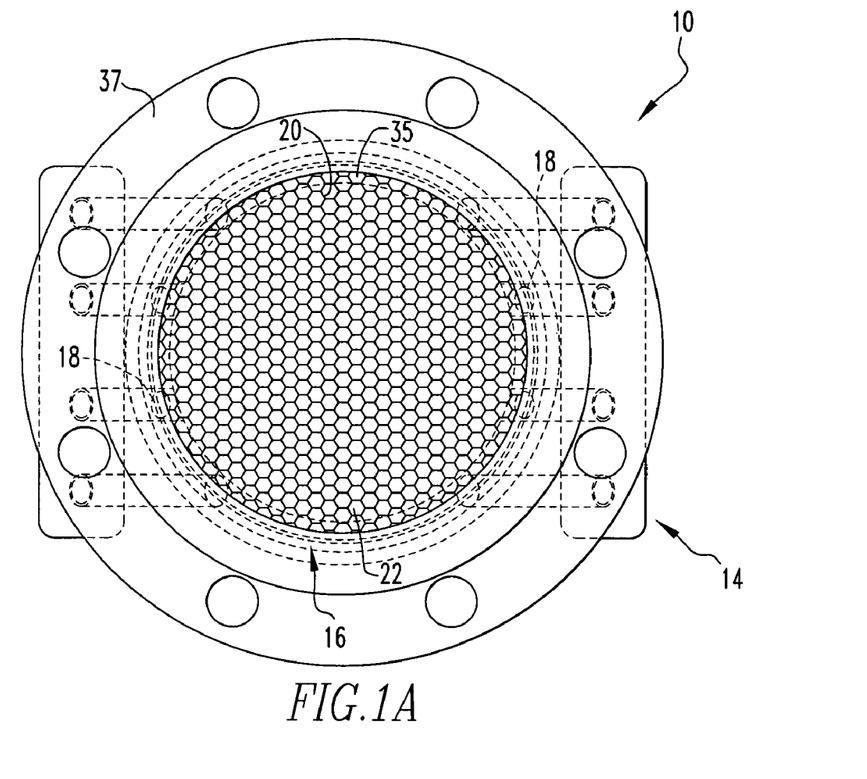
FIG. 1A is a honeycomb conditioner viewed from upstream with transducer apertures of chordal meter shown in phantom downstream.
Figure 1B:
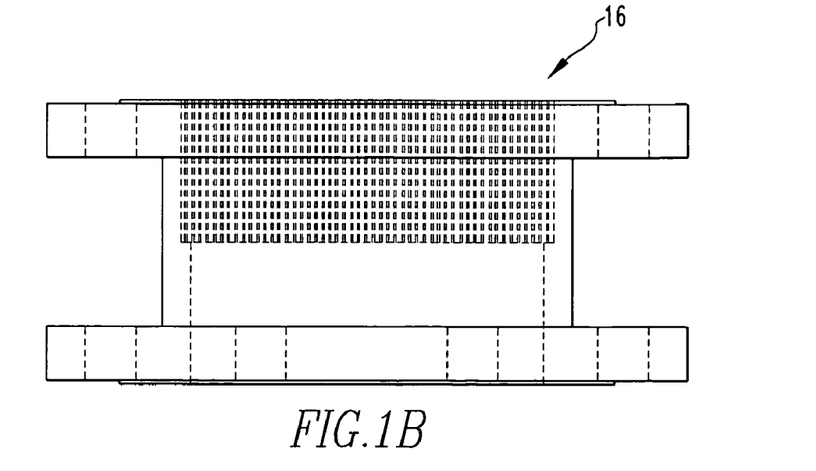
FIG. 1B is sectional view of the honeycomb conditioner (the chordal meter is not shown but couples to lower flange).
Figure 2:
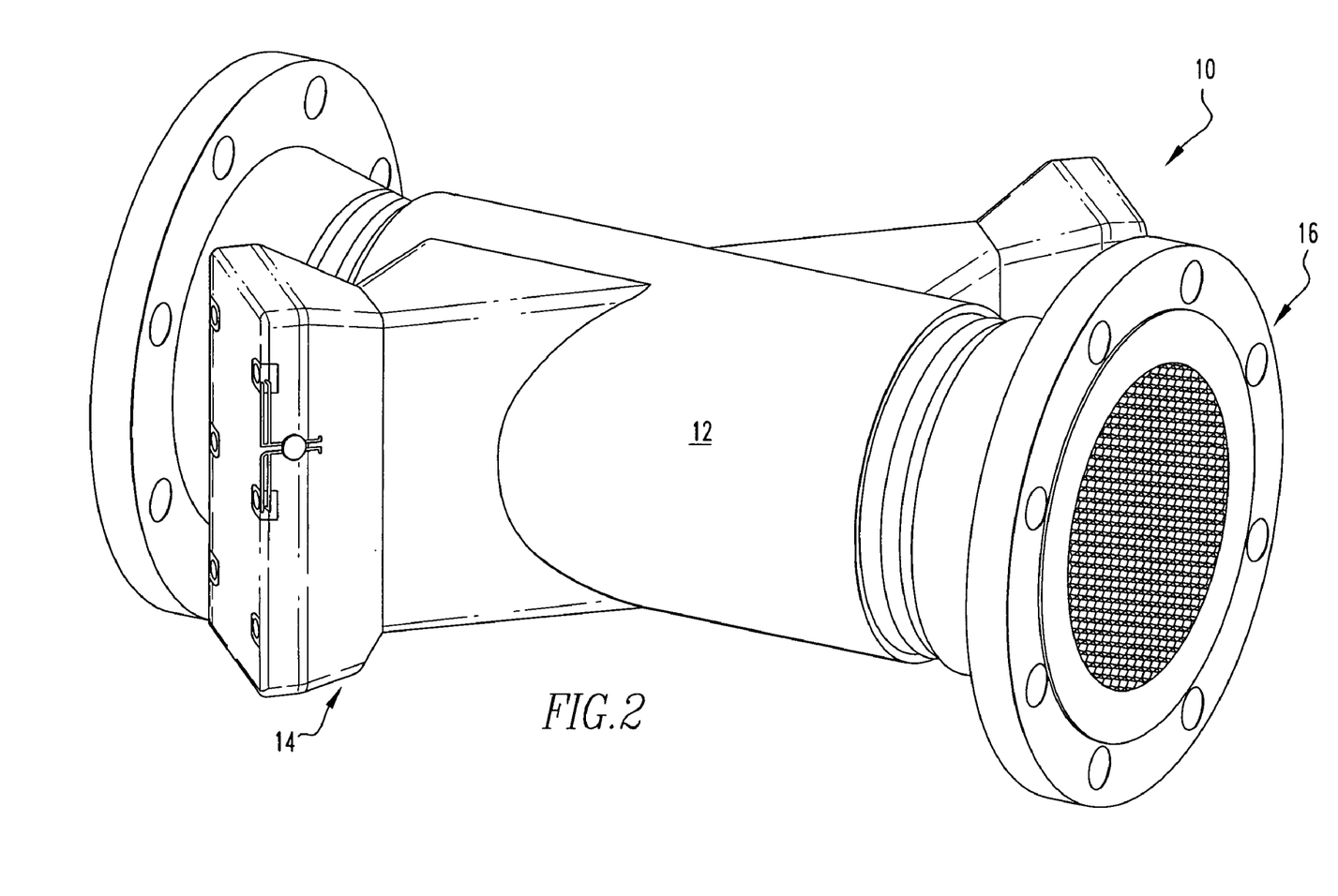
FIG. 2 is a perspective drawing of the honeycomb turbulence conditioner also as prescribed herein, with the chordal ultrasonic meter downstream.

FIGS. 1A, 1B and 2 show one of the several alternative turbulence conditioners 16 employed by this invention with a chordal ultrasonic meter 14 downstream, as prescribed by this invention. The configuration, referred to as a "honeycomb" having six sides, has been tested to demonstrate the capabilities of this invention. Results will be described in later paragraphs. The key dimensional requirements of this exemplary embodiment of the invention are as follows:

1. In the configuration shown, the pitch of the honeycomb turbulence conditioner 16—the spacing between the centers of the openings 22—is one-half the effective diameter of the apertures 18 of the ultrasonic meter 14 (¼ inch pitch vs. ½ inch aperture); although generally, the pitch should be less than the effective diameter of the aperture 18. The aperture 18 diameter is equal to the diameter of the transducer assembly if the bores of the pipe 12 penetrations containing the ultrasonic transducer assemblies are equal or nearly equal to the diameters of the transducer assemblies. In some ultrasonic meter 14 designs, the minor diameter of the opening 22 in the internal wall 20 of the pipe 12 through which the ultrasonic energy passes is smaller than the diameter of the transducer assembly. In such cases, this minor diameter of the opening 22 is the effective diameter of the aperture 18. Substantial reductions in flow variations have been obtained with the ¼ inch pitch to ½ inch aperture 18 ratio. However, even greater reductions may be obtained if the pitch to aperture 18 ratio is smaller than one-half.

2. The thickness of the walls 20 of the honeycomb is a small fraction of the pitch (in the order of ⅒). Calculations show that walls 20 that are thin relative to the pitch of the turbulence conditioner 16—in the range of ¼ to ⅒ of the pitch—will provide adequate structural strength for the turbulence conditioner 16. Because the walls 20 are thin, the eddies generated in their lee are of extremely small diameter—small enough not to impact the net statistics of the flow velocities measured by the ultrasonic meter 14 (because the eddies are very small relative to the diameter of the aperture 18). In this regard the honeycomb configuration and the other turbulence conditioner 16 configurations covered in this invention are inherently superior to the plate conditioners 16 of the previously referenced patent, where the dimensions of the ligaments are in the same order as the holes.

3. The axial length of the turbulence conditioner 16 is in the range of 5 to 20 times the pitch. This length is sufficient to eliminate global vortices created by features of the piping upstream of the conditioner 16, obviating the need for additional flow conditioning. Turbulence conditioners 16 employing large diameter tubes or plates with holes are normally provided for turbine and ultrasonic meters 14 to eliminate global vortices. With the proposed turbulence conditioners 16 these will not be necessary. The 5:1 to 20:1 length to pitch ratio also provides a configuration that is axially stiff, thereby producing a structure that does not deflect significantly in the flow stream and that is strong enough to withstand flow forces. Calculated pressure drops of the turbulence conditioners 16 described herein are comparable to the pressure drops of conventional tube type flow conditioners. The pressure drops of the turbulence conditioners 16 described herein are less than the pressure drops of plate type turbulence conditioners 16 such as described in the previously referenced patent.

4. In FIG. 2, the ultrasonic meter 14 is located approximately one internal pipe 12 diameter downstream of the turbulence conditioner 16. Data discussed later show that marked improvements in proving performance are achieved with this configuration. A separation in the range of up to 3 internal pipe 12 diameters will produce satisfactory performance. Larger separation will allow eddies to agglomerate into larger eddies and new eddies to form, reducing the effectiveness of the acoustic beams of the ultrasonic meter 14 in averaging the rotational velocities of the turbulent eddies. Axial distances shorter than ½ diameter can cause local velocity profile perturbations produced or preserved by the turbulence conditioner 16 to be "seen" by the ultrasonic meter 14, degrading its capability to integrate the axial velocity profile numerically.

Figure 4C:
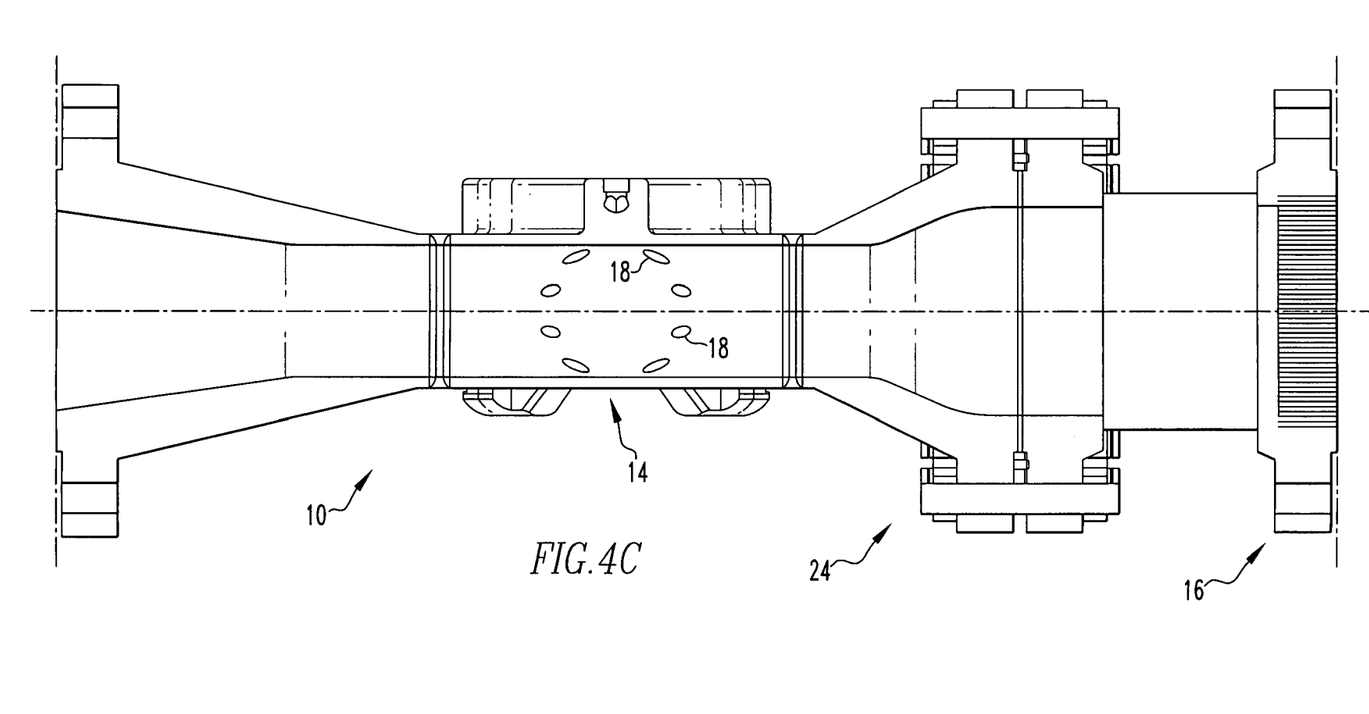
FIG. 4C is a side sectional view of the "egg-crate" turbulence conditioner.

FIGS. 3A, 3B, 3C, 4A, 4B and 4C show alternative configurations for turbulence conditioners 16 meeting the requirements prescribed above. For each design, the axial length of the conditioner 16 provides stiffness which reduces axial deflections and stresses to very small values provided the egg-crate of FIGS. 3A, 3B, and 3C and the tube bundle of FIGS. 4A, 4B, 4C can be made to act as a plate such that the tensile stresses on the downstream end can be transmitted from tube to tube. For the tube bundle design of FIGS. 4A, 4B, and 4C, this is accomplished by redundant means:

(a) A shrink fit, produced by heating the enclosing pipe 12 100° F. before inserting the bundled tubes, produces frictional forces between tubes capable of withstanding the hydraulic forces tending to dislodge them, and (b) Spot welds between adjacent tubes near the downstream end of the bundle, ensures that the bundle acts as a single structure. Alternatively, the unions among tubes can be achieved by soldering.

Figure 3A:
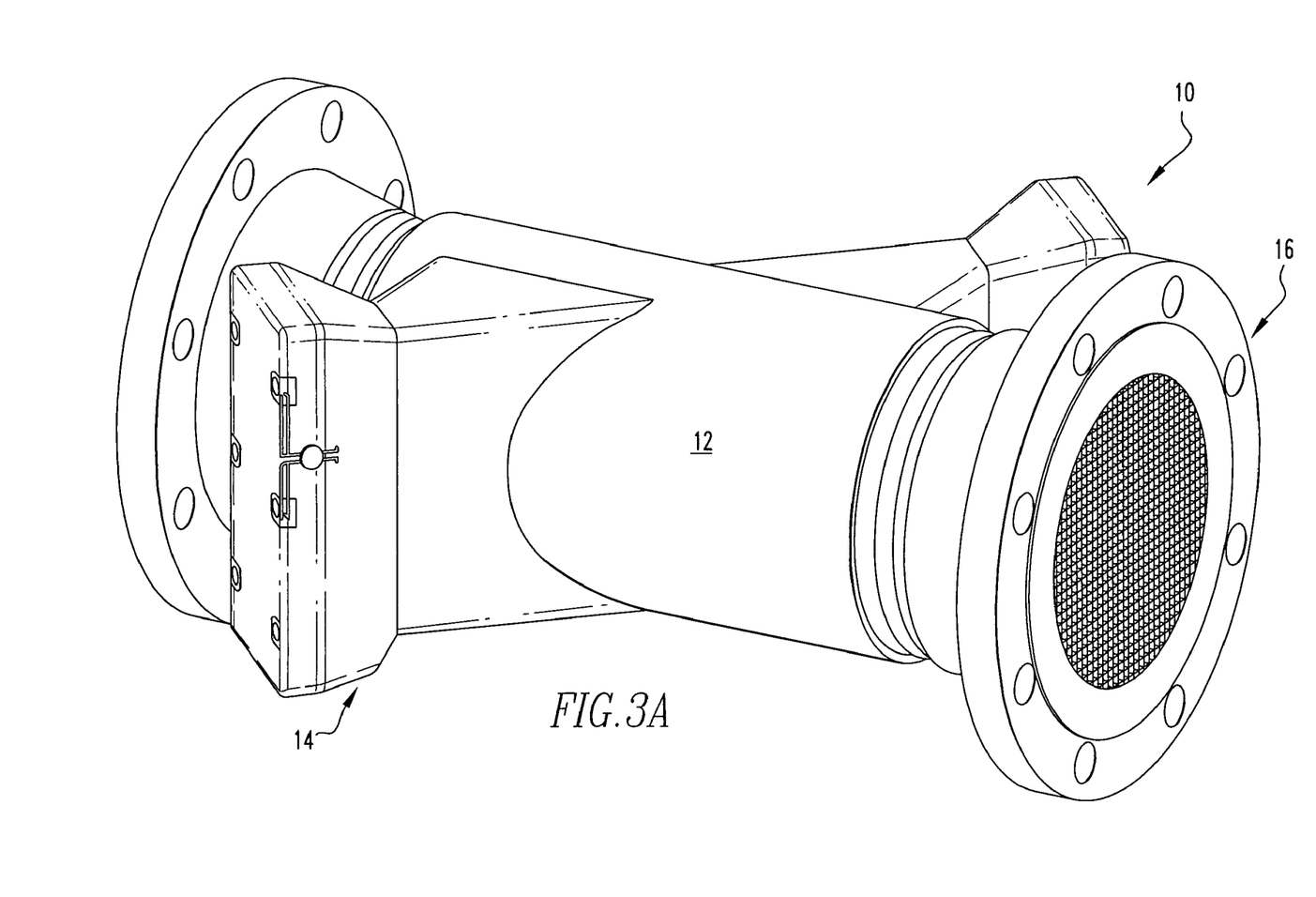
FIG. 3A is a perspective drawing of an "egg-crate" turbulence conditioner also as prescribed herein, with the chordal ultrasonic meter downstream.
Figure 3B:
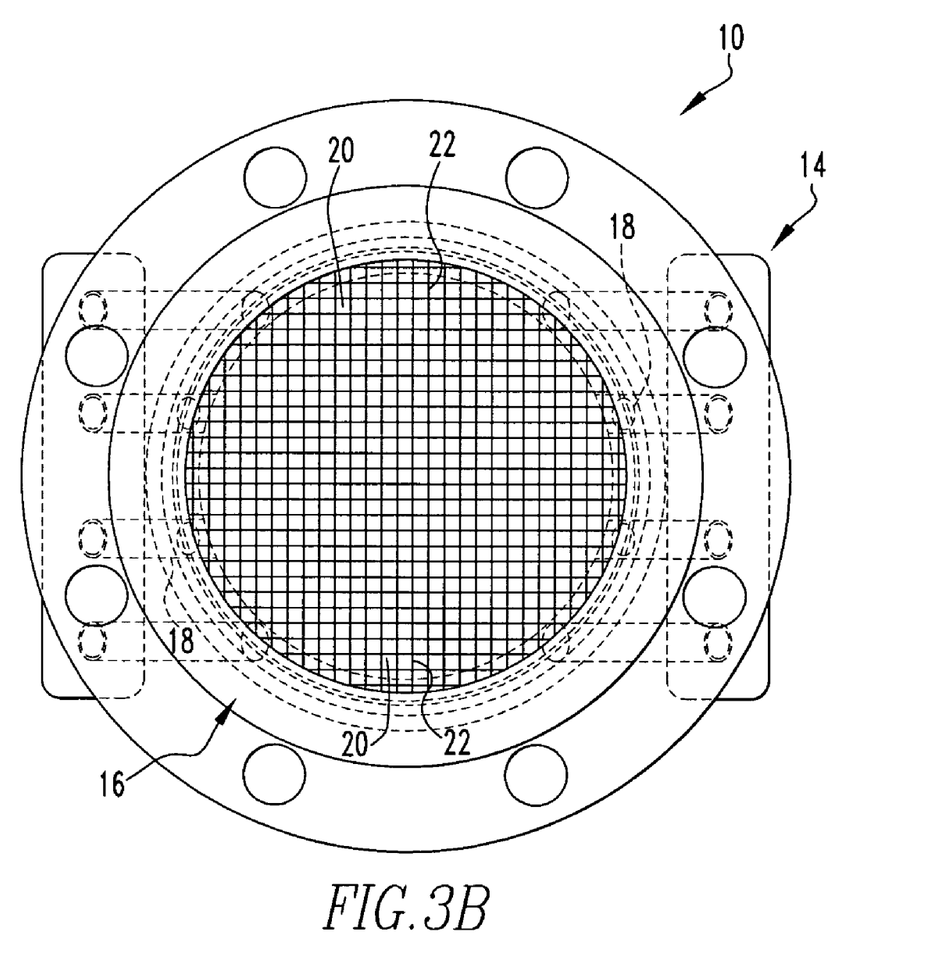
FIG. 3B is a sectional view of the "egg-crate" turbulence conditioner.
Figure 3C:
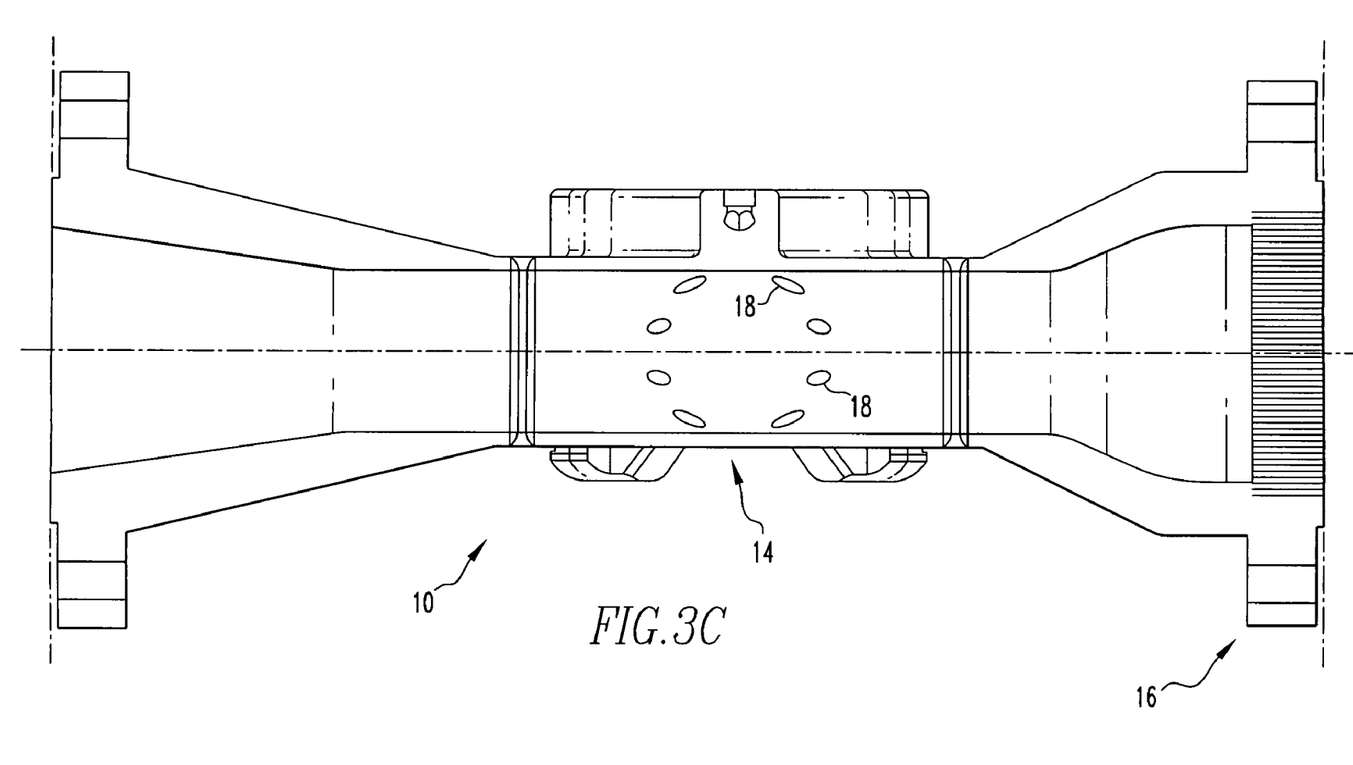
FIG. 3C is a side sectional view of the "egg-crate" turbulence conditioner.

Spot welds would also be used to stiffen the downstream corners of the egg-crate conditioner 16 of FIGS. 3A and 3B.

Because petroleum pipelines are not free of debris (for example precipitated wax or asphaltenes) and because of the relatively small openings 22 of the conditioners 16 prescribed in this invention, it is beneficial to install a basket type flow filter 26 or fine mesh strainer five or more diameters upstream of the turbulence conditioners 16 prescribed herein. The aggregate pressure loss generated by the filter 26 or strainer, the turbulence conditioner 16, and the ultrasonic flowmeter 14 itself is less than that of competing technologies. A turbine meter 14 also benefits from a similar filter 26 and a flow conditioner having a similar pressure drop and itself generates a pressure drop, which the ultrasonic meter 14 does not. A positive displacement meter 14 also generally has a filter 26 and though it generally has no turbulence or flow conditioner, itself generates a pressure loss greater than that produced by the turbulence conditioners 16 described herein.

Figure 5A:
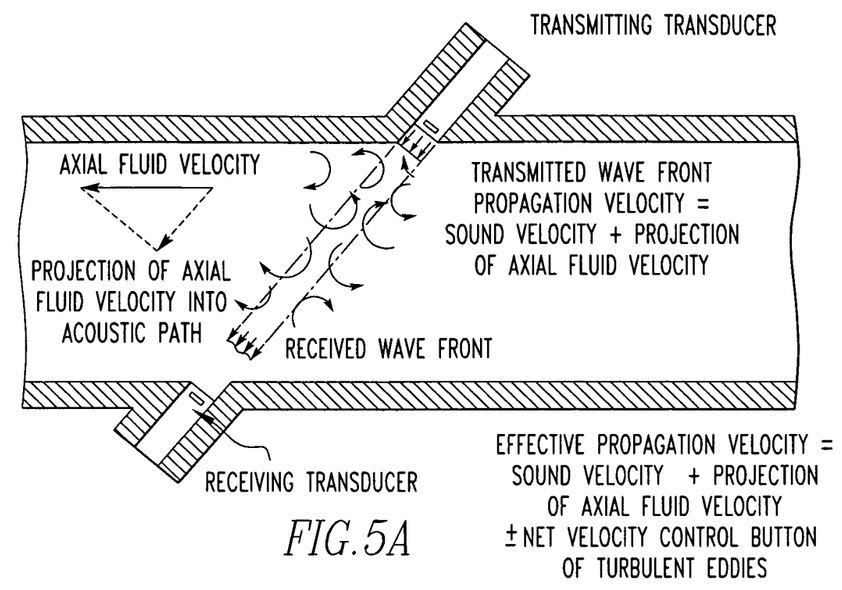
FIG. 5 is a sketch showing turbulent eddies intersecting an ultrasonic beam, (a) without a turbulence conditioner and (b) with the turbulence conditioners of this invention.
Figure 5B:
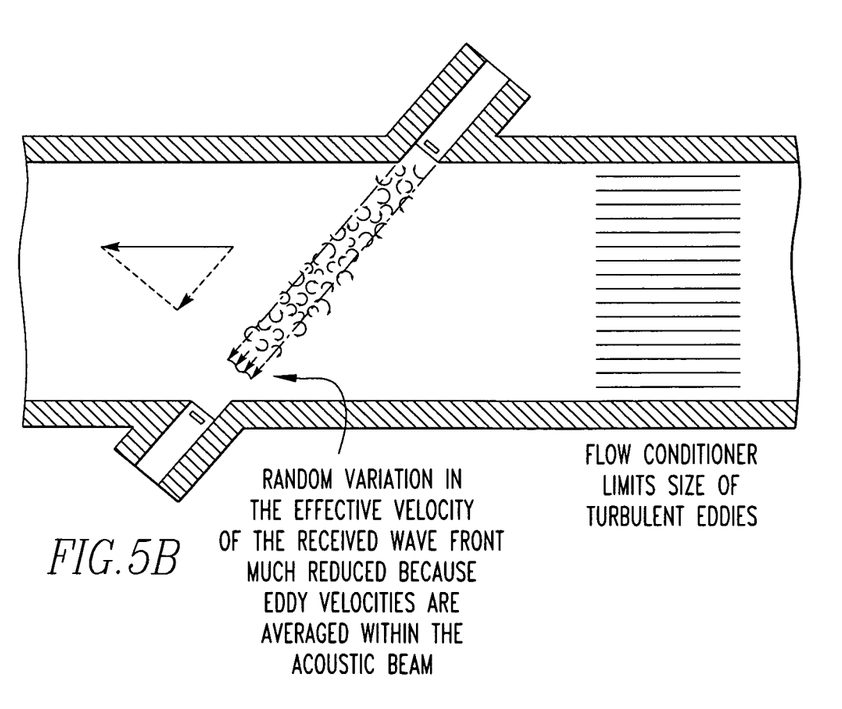

FIGS. 5A and 5B illustrate the principles of this invention. Transit time ultrasonic meters measure the travel times of pulses of ultrasonic energy transiting from a transmitting transducer to a receiving transducer. In the figures, a transmitting transducer has generated a pulse that is traveling diagonally across the flow stream in the direction of flow. The pulse's transit time is given by the quotient of the distance between transducers and the propagation velocity of the ultrasound. For a transmission in the direction shown in the figure, the propagation velocity is the sum of the velocity of ultrasound in the fluid at rest and the fluid velocity projected onto the acoustic path. When a second transmission is generated in the opposite direction (that is, from the downstream transducer in the figure to the upstream transducer) the propagation velocity is the difference between the velocity of ultrasound in the fluid at rest and the fluid velocity projected onto the acoustic path. Thus, knowing the path length, the two transit time measurements yield two equations in two unknowns: the ultrasound velocity in the fluid at rest and the fluid velocity projected onto the acoustic path. But, as illustrated in FIG. 5A, the fluid velocity projected onto the acoustic path is determined not only by the projection of the average axial velocity (the variable that needs to be measured) but also the net projection from the multiple turbulent eddies that accelerate or retard the pulse on its way. The transmission in the opposite direction is also affected by the turbulence, but not generally by the same eddies (which may have moved on between transmissions). For the condition illustrated in FIG. 5A, therefore, multiple measurements are needed to average out the effects of the turbulent eddies and thereby to determine the average axial fluid velocity along the path.

When the maximum eddy diameter is made significantly smaller than the diameter of the transducer apertures that form the acoustic paths along which the pulses of ultrasound travel, the disturbances to the ultrasound propagation velocity produced by the tangential velocity of an eddy tend to be canceled in each transmission. This is illustrated in FIG. 5B. Within the beam of ultrasound, the component of an eddy that hastens the ultrasound transmission is offset by the component of the same eddy that retards it. Eddies typically move at a velocity close to the average fluid velocity—typically in the order of 100 inches/second. The propagation velocity of the ultrasound is in the order of 50,000 inches/second. Thus the displacement, during a pulse transit, of an eddy within the 0.7 inch projected axial width of a (typical) 0.5 inch ultrasonic transmission beam is negligibly small. Thus the rule is that the turbulence conditioner design should allow the passage of only those eddies which are significantly smaller than the aperture diameter and should break up larger eddies such that only eddies whose diameter is significantly smaller than the aperture are produced.

Figure 6:
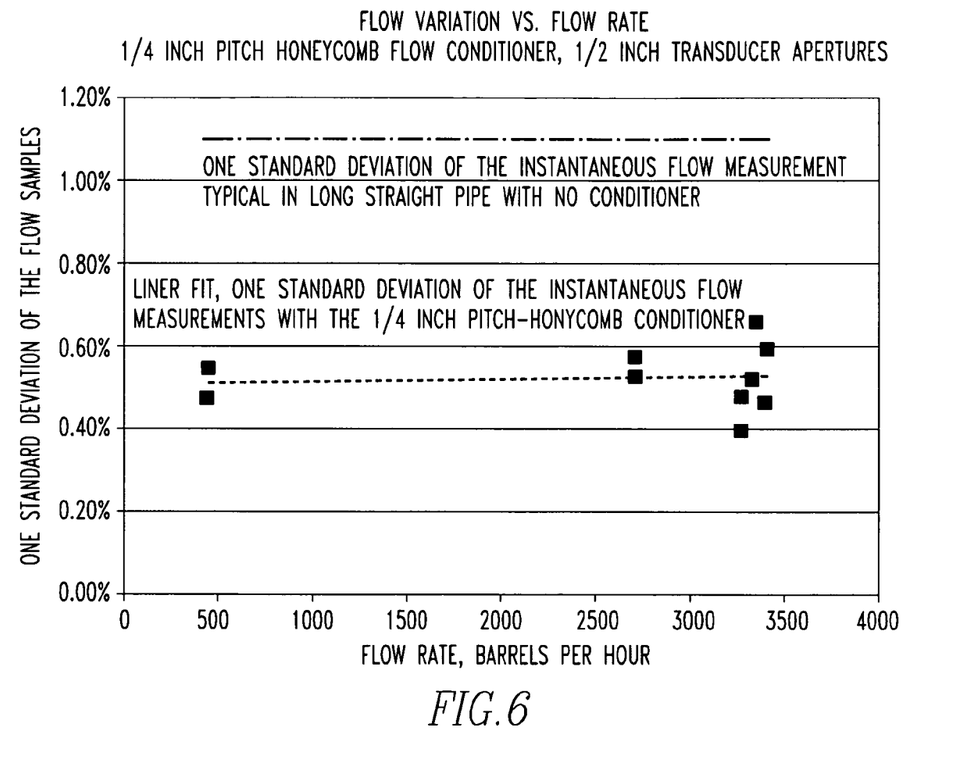
FIG. 6 is a plot of experimental results obtained with the honeycomb turbulence conditioner and flowmeter as described herein, showing the magnitude of the flow variations, as measured by one standard deviation of the flow samples, as a function of flow rate. The magnitude of variations that would typically be obtained without the turbulence conditioner is also shown.

As noted above, in the present invention, the random deviations of flow samples of the ultrasonic meter 14 are made small by reducing the turbulent eddy sizes such that they are effectively averaged within the acoustic beams of the meter 14. The data of FIG. 6 show the reduction produced by a ¼ inch honeycomb turbulence conditioner 16, as shown in FIG. 1, in a 6 inch duplex ultrasonic meter 14 (the duplex meter 14 consists of two essentially independent meters 14 of four paths each), having transducer apertures 18 of approximately ½ inch diameter. It will be seen that, over a 9:1 range of flows, the turbulence conditioner 16 produces standard deviations for individual flow samples of approximately ½% (versus a standard deviation of 1.2%, which would be expected from the same meter 14 operating in a straight pipe 12 without the turbulence conditioner 16).

The reduction in the standard deviation in the flow samples translates into improved proving performance. The proving performance with the honeycomb conditioner 16 was measured by examining the range of meter 14 factors in sets of 5 proving runs each. Ten sets of 5 run trials were carried out for each of the two 4 path meters 14, at two different flow rates and with two different proving volumes—a total of thirty 5 run sets for each of the two meters 14. For twenty of these run sets a prover volume of 20 barrels was employed, 10 sets each at 3400 and 2700 barrels per hour respectively. For the remaining runs a prover volume of 10 barrels with a flow rate of 3400 barrels per hour was employed. Proving volumes in the 10 to 20 barrel range are typical for the two flow rates.

Figure 7:
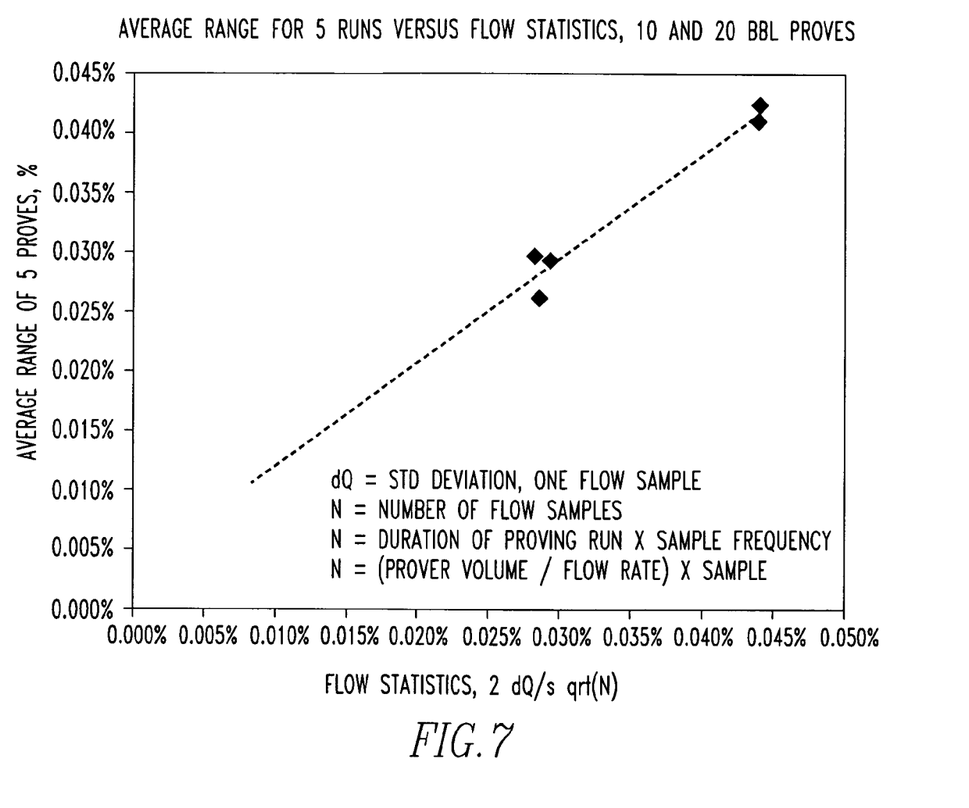
FIG. 7 is a plot of experimental results, showing the average range of a set of five meter factor measurements obtained with the honeycomb turbulence conditioner and ultrasonic flowmeter as described herein, as a function of the calculated standard deviation of the mean flow during a proving run, for proving volumes typical of the flow rates present during the measurements.

Proving data collected during the tests with the turbulence conditioner 16 of FIG. 1 are presented in FIG. 7. The abscissa of FIG. 7 is the statistical characterization of the flow variability developed in a preceding section: $2\times\sigma_{mean}$, twice the quotient of the standard deviation of the individual flow samples measured during a proving run and the square root of the number of samples N taken during that run. N is computed as the product of the ultrasonic meter 14 sample rate (about 50 Hz) and the duration of the run. The ordinate of FIG. 7 is the average range of the proving runs. A linear trend of the data shows that the average range of the data from a set of 5 proving runs is approximately equal to $2\times\sigma_{mean}$.

This trend line can be used to project proving performance. If two standard deviations of the measurements are ±0.025%, a normal distribution shows that the odds that one run will fall outside a 0.05% band encompassing the mean are 1 in 20. The odds that any one of the remaining four runs will fall outside the opposite end of the band are 1 in 40. Thus the odds of obtaining two results differing by more than 0.05% are: $(1/20)\times(1/40)+(1/20)\times(1/40)+(1/20)\times(1/40)+(1/20)\times(1/40)=0.005$. With $2\times\sigma_{mean}=0.025\%$, sets of five proving runs should fall within the prescribed 0.05% range 99.5% of the time.

Figure 8:
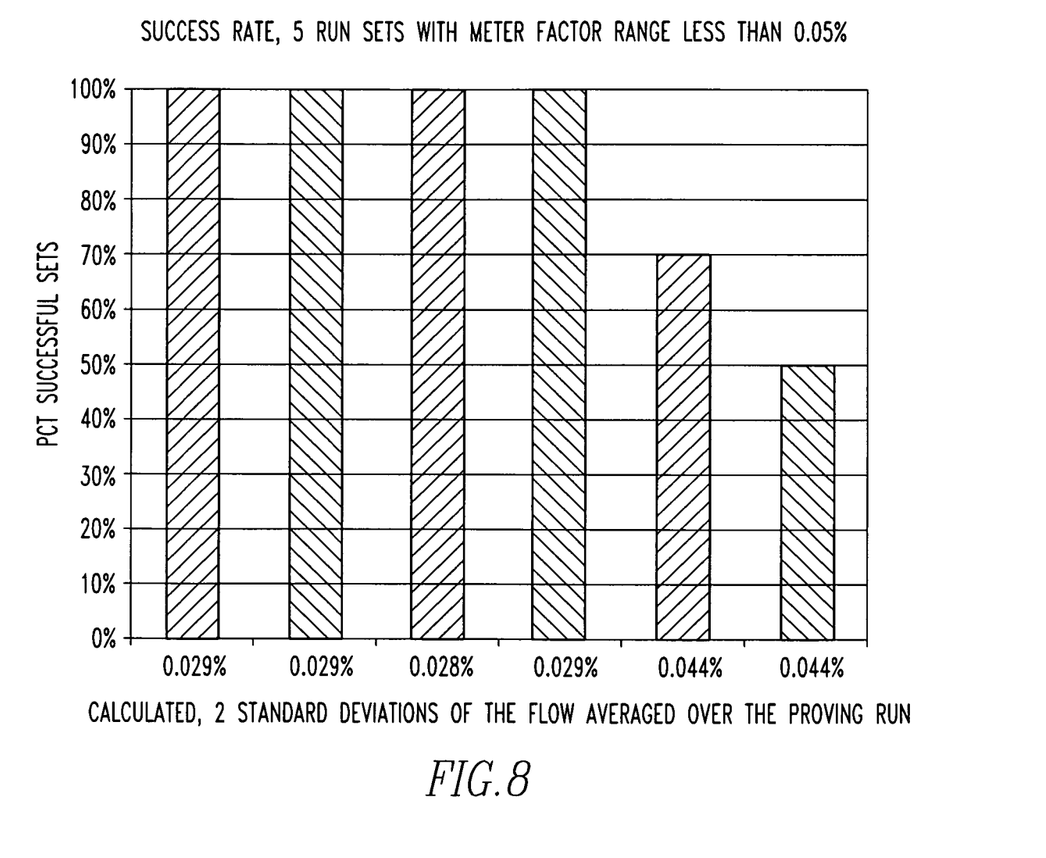
FIG. 8 is a bar chart of experimental results showing the percentage of successful sets of 5 proving runs each, as a function of the calculated standard deviation of the mean flow during the proving runs.

FIG. 8 shows the percentage of 5 run prove sets that were actually successful—that met the requirement of 0.05% range for 5 proves. As projected above, the figure shows that, when $2\times\sigma_{mean}$ is 0.025% or less, 100% of the 5 run sets were successful. When $2\times\sigma_{mean}$ is in the 0.045% range, about 50% to 70% of the 5 run sets are successful. These latter results are also roughly in accordance with statistical predictions.

The performance of FIGS. 7 and 8 is markedly better than would be obtained with the same chordal flowmeter 14 without the turbulence conditioner 16. Without the conditioner 16, $2\sigma_{mean}$ would be in the 0.06% range, at best, for the 20 barrel proves, implying a success rate of less than 50%, which is also in agreement with experience.

As has been previously noted, reducing nozzles 24, such as described in the patent previously referenced (U.S. Pat. No. 6,647,806, incorporated in its entirety by reference herein), can be applied with the turbulence conditioners 16 described herein to enhance proving performance still further. FIG. 4 shows a tube bundle turbulence conditioner 16 meeting the dimensional parameters prescribed herein upstream of a reducing nozzle 24, with an ultrasonic meter 14 downstream of the nozzle 24. An expanding diffuser downstream of the meter 14 restores the upstream pipe 12 diameter at minimal loss. In the flow nozzle 24 configuration, the ultrasonic flow meter 14 is located in the cylindrical throat of the nozzle 24, which increases the mean fluid velocity seen by the meter 14 as the reciprocal of the beta ratio squared. The beta ratio is the quotient of the nozzle 24 throat diameter and the upstream pipe 12 diameter. The reduction in turbulence comes about because, while the nozzle 24 increases the average fluid velocity, it does not significantly alter the tangential velocities of the turbulent eddies. Thus the turbulence as a percentage of average fluid velocity is reduced. Tests have demonstrated the ability of nozzles 24 having a beta ratio of 0.67 to reduce the standard deviation of individual flow measurements by about a factor of two, as might be expected since $(1/0.67)^2\approx 1/2$. The use of a nozzle 24 downstream of the turbulence conditioner 16 but upstream of the flowmeter 14 would reduce the standard deviations of the flow of FIG. 6 from 0.5% to 0.25%. The arrangement would halve the $(2\sigma_{mean})$ data of FIGS. 7 and 8, leading to 100% success even with the 10 barrel proving volume.

Figure 9:
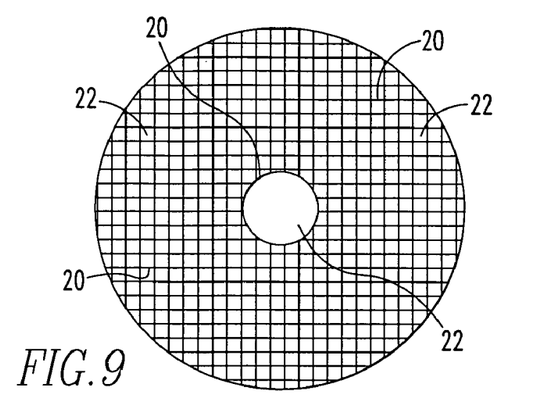
FIG. 9 is a cross-section of a conditioner with different sized holes.
Figure 10:
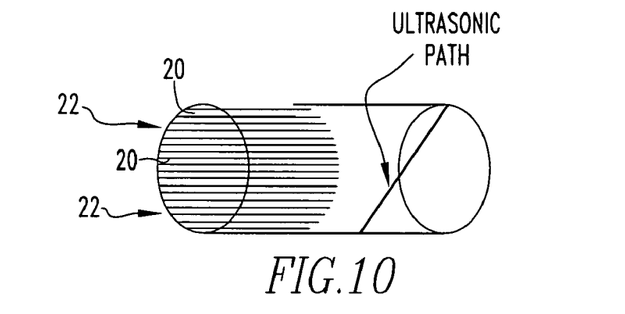
FIGS. 10 and 11 show a conditioner where the holes are not of equal dimensions.
Figure 11:
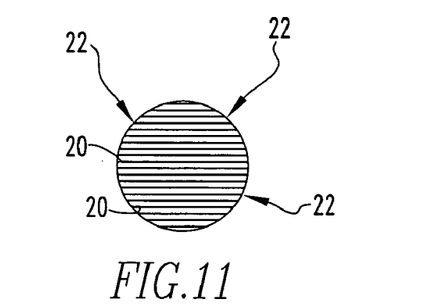

It should be noted that the pitch does not have to be fixed. FIG. 9 shows larger holes in some part of the cross section of the conditioner 16. FIGS. 10 and 11 show the openings 22 are not of equal dimensions, but vary.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A method for producing a turbulence conditioner for use with an ultrasonic flow meter in a pipe comprising the steps of:
    identifying an effective diameter of an aperture of the flow meter to be disposed in an opening in the pipe through which the flow meter communicates pulses of ultrasonic energy with the interior of the pipe; and
    building a conditioner with a pitch between openings in the conditioner which is less than the effective diameter.

2. A method as described in claim 1 wherein the building step includes the step of building walls having a thickness between the openings of the conditioner that are a function of the pitch.

3. A method as described in claim 2 wherein the building step includes the step of building the conditioner with a length that is a function of the pitch.

4. A method as described in claim 2 wherein the building step includes the step of building the conditioner wherein the walls have a thickness between 1/4 to 1/10 of the pitch.

5. A method as described in claim 4 wherein the building step includes the step of building the conditioner wherein the length is 5 to 20 times the pitch.

6. A method as described in claim 5 wherein the building step includes the step of building the conditioner wherein the holes have a cross-section that is two or more sided.

7. A method as described in claim 5 wherein the building step includes the step of building the conditioner wherein the holes have a circular cross-section.

8. A method as described in claim 7 wherein the building step includes the step of building the conditioner wherein the pitch is a function of the meter's maximum velocity.

\* \* \* \* \*